(12) United States Patent
Chen et al.

(10) Patent No.: US 6,953,244 B2
(45) Date of Patent: Oct. 11, 2005

(54) INK SET COMPOSITION, AND AN APPARATUS AND METHOD OF FORMING IMAGES HAVING REDUCED GLOSS DIFFERENTIAL

(75) Inventors: Huijuan D. Chen, Webster, NY (US); Gang C. Han-Adebekun, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 215 days.

(21) Appl. No.: 10/302,210

(22) Filed: Nov. 22, 2002

(65) Prior Publication Data

US 2004/0100542 A1 May 27, 2004

(51) Int. Cl.$^7$ .................................................. B41J 2/17
(52) U.S. Cl. ............................ 347/95; 347/43; 347/100
(58) Field of Search ............................ 347/95, 96, 98, 347/100, 43; 106/31.13, 31.61

(56) References Cited

U.S. PATENT DOCUMENTS

| | | | |
|---|---|---|---|
| 4,630,076 A | 12/1986 | Yoshimura | |
| 6,126,281 A | 10/2000 | Shimoda et al. | |
| 6,167,224 A | 12/2000 | Dalal | |
| 6,209,998 B1 * | 4/2001 | Yue ............................ | 347/102 |
| 6,268,101 B1 | 7/2001 | Yacobucci et al. | |
| 6,394,569 B1 | 5/2002 | Zeman | |
| 6,604,819 B2 | 8/2003 | Nishita | |
| 2002/0025413 A1 | 2/2002 | Ohbayashi et al. | |
| 2002/0156153 A1 | 10/2002 | Tsang et al. | |
| 2003/0085974 A1 | 5/2003 | Shimomura et al. | |
| 2003/0189626 A1 | 10/2003 | Kataoka et al. | |
| 2003/0193553 A1 | 10/2003 | Issler | |
| 2004/0017406 A1 | 1/2004 | Kato et al. | |
| 2004/0030001 A1 | 2/2004 | Ma et al. | |
| 2004/0032473 A1 | 2/2004 | Ishimoto et al. | |

FOREIGN PATENT DOCUMENTS

| | | |
|---|---|---|
| EP | 1057646 A2 | 5/2000 |
| EP | 1048466 A2 | 11/2000 |
| EP | 1108757 A2 | 6/2001 |
| EP | 1302324 A1 | 10/2003 |
| JP | 2001277488 A | 3/2000 |
| JP | 2003291484 A | 10/2003 |

* cited by examiner

Primary Examiner—Lamson Nguyen
(74) Attorney, Agent, or Firm—William R. Zimmerli

(57) ABSTRACT

An ink set composition, an apparatus, and a method of providing an image on a receiver are provided. The method includes operating a printhead having a first segment that applies a gloss matching fluid to the non-imaged area of the printed area of the image and a second segment that applies an ink set having at least one color to the imaged area of the printed area of the image, wherein the ink set has a predetermined minimum gloss value ($GV_{min}$) and a maximum gloss value ($GV_{max}$), and the gloss matching fluid has a predetermined gloss value ($GV_{GMF}$), wherein the predetermined gloss value $GV_{GMF}$ satisfying the following condition: $0.1\ GV_{min} \leq GV_{GMF} \leq 1.5\ GV_{max}$, wherein $GV_{min}$ and $GV_{max}$ are predetermined gloss values calculated according to the following equations:

$$GV_{min} = \mathrm{MIN}(GV_1, GV_2, \ldots, GV_i, \ldots, GV_n)$$

$$GV_{max} = \mathrm{MAX}(GV_1, GV_2, \ldots, GV_i, \ldots, GV_n)$$

where, i is a variable which identifies a certain color patch used in the evaluation, and n is the total number of color patches used in the evaluation. The apparatus includes an ink set source having at least one color and a source of gloss matching fluid connected to the printhead adapted to deliver the ink set and the gloss matching fluid to a receiver based on data received from a controller.

92 Claims, 6 Drawing Sheets

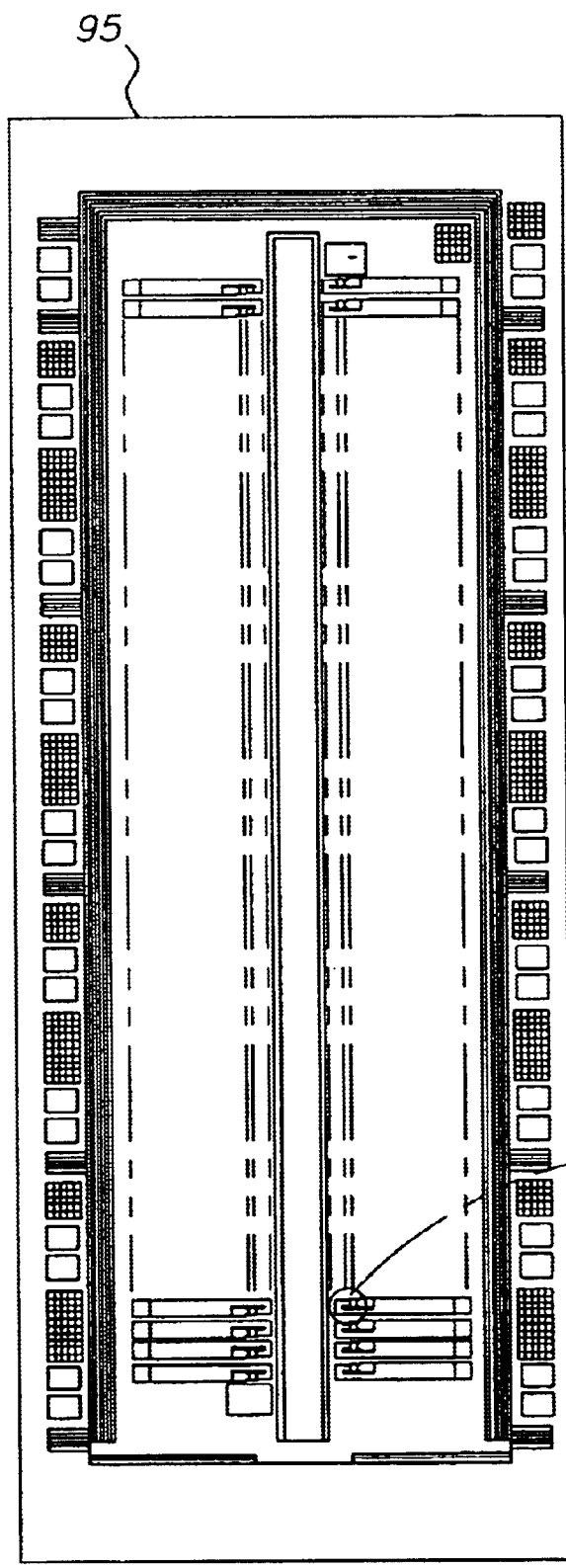
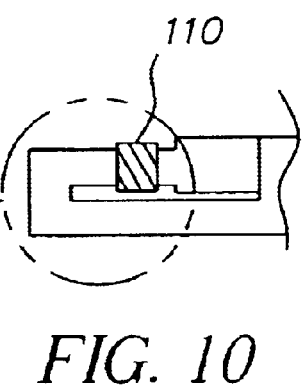
FIG. 10
FIG. 9

INK SET COMPOSITION, AND AN APPARATUS AND METHOD OF FORMING IMAGES HAVING REDUCED GLOSS DIFFERENTIAL

FIELD OF THE INVENTION

This invention relates generally to the field of digitally controlled printing ink set compositions, apparatuses and methods, and more particularly, to educing or minimizing a gloss differential between imaged areas and non-imaged areas of an image produced by these ink set compositions, apparatuses and methods.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an image wise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. Commonly used carrier media include water, mixtures of water and organic co-solvents and high boiling organic solvents, such as hydrocarbons, esters, ketones, etc Although there have been many recent advances in the art of dye-based ink jet inks, such inks still suffer from major deficiencies such as poor image stability against light and gases commonly contained in the air, such as ozone (O3), nitrogen oxide (NOx) and sulfur oxide (SOx), especially on receivers having porous ink receiving layers. One method of addressing these limitations is to use pigment-based inks. When designed properly, pigment based inks usually can demonstrate image stability significantly higher than the dye-based inks, and more importantly, approaching the archival quality as compared to silver halide photographic prints.

A major image quality drawback of pigment based inks is "differential gloss", where the gloss of non-imaged areas is very different from that of imaged areas. One solution to this problem is to cover the entire receiver with a protective fluid as described in EP1057646 and EP1048466. However, this approach involves laying additional fluid over areas of a receiver already having inks deposited thereon. When an area of the receiver reaches its fluid absorbing capacity, adding additional fluids to the same area may lead to image artifacts such as inter-color bleed and mottling effect. Additionally, due to the drying time associated with ink and the large areas often requiring protective fluid, the overall print productivity can be significantly limited.

An object of the present invention is to use image-wise deposition of a gloss matching fluid in an ink jet printing system, applying the fluid only in non-imaged areas of an image. Furthermore, the composition of the fluid can be optimized based on physical properties affecting the gloss levels to achieve minimized gloss difference between imaged and non-imaged areas.

SUMMARY OF THE INVENTION

According to a feature of the present invention, a method of providing an image on a receiver includes operating a printhead having a first segment that applies a gloss matching fluid to the non-imaged area of the printed area of the image and a second segment that applies an ink set having at least one color to the imaged area of the printed area of the image, wherein the ink set has a predetermined minimum gloss value ($GV_{min}$) and a maximum gloss value ($GV_{max}$), and the gloss matching fluid has a predetermined gloss value ($GV_{GMF}$), wherein the predetermined gloss value $GV_{GMF}$ satisfying the following condition: $0.1\ GV_{min} \leq GV_{GMF} \leq 1.5\ GV_{max}$, wherein $GV_{min}$ and $GV_{max}$ are predetermined gloss values calculated according to the following equations:

$$GV_{min} = \mathrm{MIN}(GV_1, GV_2, \ldots, GV_i, \ldots, GV_n)$$

$$GV_{max} = \mathrm{MAX}(GV_1, GV_2, \ldots, GV_i, \ldots, GV_n)$$

where i is a variable which identifies a certain color patch used in the evaluation, and n is the total number of color patches used in the evaluation.

The method can also include processing data representing the image to identify a printed area of the image and a non-printed area of the image; and processing data representing the printed area of the image to identify an imaged area and a non-imaged area of the printed area of the image.

According to another feature of the present invention, an apparatus for providing an image on a receiver includes an ink set source having at least one color, the ink set having a predetermined minimum gloss value ($GV_{min}$) and a maximum gloss value ($GV_{max}$) and a source of gloss matching fluid having a predetermined gloss value ($GV_{GMF}$). A controller is adapted to process data representing the image to identify a printed area of the image and a non-printed area of the image and data representing the printed area of the image to identify an imaged area and a non-imaged area of the printed area of the image. A printhead is connected in electrical communication with the controller. The printhead has a first segment connected in fluid communication to the source of gloss matching fluid, the first segment being adapted to apply the gloss matching fluid to the non-imaged area of the printed area of the image based on data received from the controller. The printhead has a second segment connected in fluid communication to the ink set source, the second segment being adapted to apply the ink set having at least one color to the imaged area of the printed area of the image based on data received from the controller, wherein the predetermined gloss value $GV_{GMF}$ satisfying the following condition: $0.1\ GV_{min} < GV_{GMF} < 1.5\ GV_{max}$, wherein $GV_{min}$ and $GV_{max}$ are predetermined gloss values calculated according to the following equations:

$$GV_{min} = \mathrm{MIN}(GV_1, GV_2, \ldots, GV_i, \ldots, GV_n)$$

$$GV_{max} = \mathrm{MAX}(GV_1, GV_2, \ldots, GV_i, \ldots, GV_n)$$

where i is a variable which identifies a certain color patch used in the evaluation, n is the total number of color patches used in the evaluation.

According to another feature of the present invention, an inkjet ink set composition includes at least one color ink and a gloss matching fluid, the gloss value of the gloss matching fluid ($GV_{GMF}$) satisfying the following condition:

$0.1\ GV_{min} < GV_{GMF} < 1.5\ GV_{max}$, wherein $GV_{min}$ and $GV_{max}$ are predetermined gloss values calculated according to the following equations:

$$GV_{min} = MIN(GV_1, GV_2, \ldots, GV_i, \ldots, GV_n)$$

$$GV_{max} = MAX(GV_1, GV_2, \ldots, GV_i, \ldots, GV_n)$$

where i is a variable which identifies a certain color patch used in the evaluation, and n is the total number of color patches used in the evaluation.

BRIEF DESCRIPTION OF THE DRAWINGS

In the detailed description of the embodiments of the invention presented below, reference is made to the accompanying drawings, in which:

FIGS. 5–10 are additional printer and cartridge embodiments usable with the invention.

DETAILED DESCRIPTION OF THE INVENTION

The present description will be directed in particular to elements forming part of, or cooperating more directly with, apparatus and methods in accordance with the present invention. It is to be understood that elements not specifically shown or described may take various forms well known to those skilled in the art.

Figure 1:
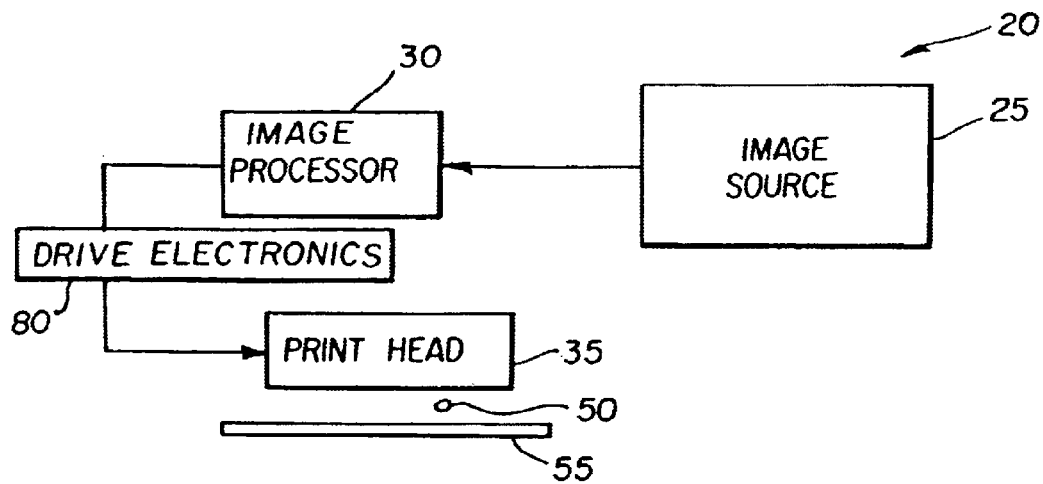
FIG. 1 is a function block diagram illustrating a printer usable with the invention.
Figure 2:
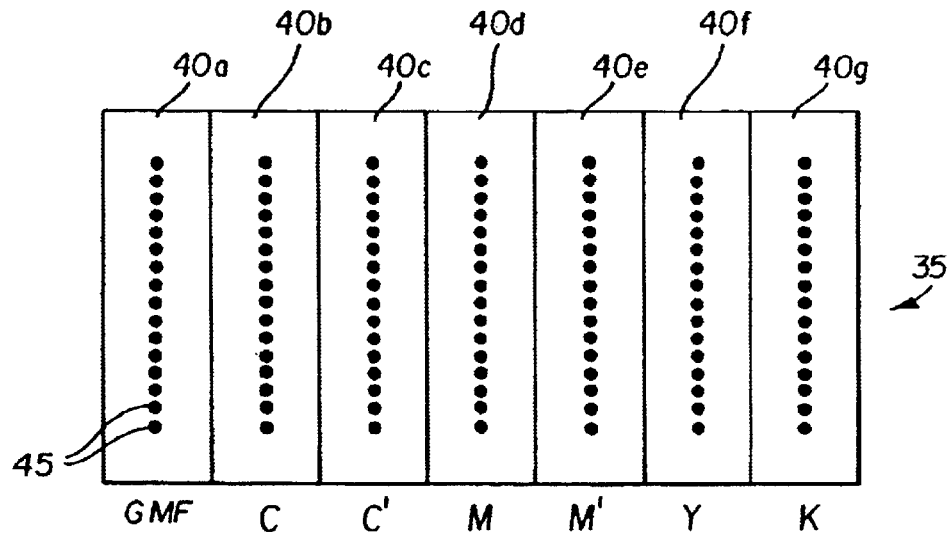
FIG. 2 is a plan view of one type of printhead of the printer of FIG. 1 capable of ejecting a gloss matching fluid droplet(s) and an ink droplet(s)

Referring to FIG. 1, there is shown a printer system 20 comprising a digital image source 25 having image data therein to be supplied to an image processor 30, often referred to as a controller, etc. The image processor 30 converts the image data into an ink drop pattern, which pattern is transmitted to a multi-color (e.g., six-color) print head 35, as shown in FIG. 2, through print head drive electronics 80. Printer system 20 can be any type of printer system known in the art, for example, a drop on demand type printer system or a continuous type printer system. Additionally, printer system 20 can be a page width type printer system or a scanning head type printer system. Alternatively, print head 35 can include more or less colors, or can be a single color print head.

Referring to FIG. 2, print head 35 may comprise a plurality of segments 40a through 40g (for example, seven segments). Respective ones of segments 40b–40g are assigned a predetermined ink source 85 (described with respect to FIGS. 5–10) with the ink having a colorant (for example, cyan, light cyan, magenta, light magenta, yellow, and black) to be ejected therefrom. Each of these inks has a gloss level associated with it, as described below. Segment 40a is assigned a gloss matching fluid to be ejected therefrom, in order to reduce or even eliminate the problem described above. Also, each of the segments 40a–40g may include a plurality of drop forming mechanisms and ejection nozzles 45 capable of ejecting a plurality of droplets 50 therefrom toward a receiver 55. While a print head 35 having seven segments is described above, the print head 35 can have additional segments or fewer segments depending on the particular printing application.

Figure 3:
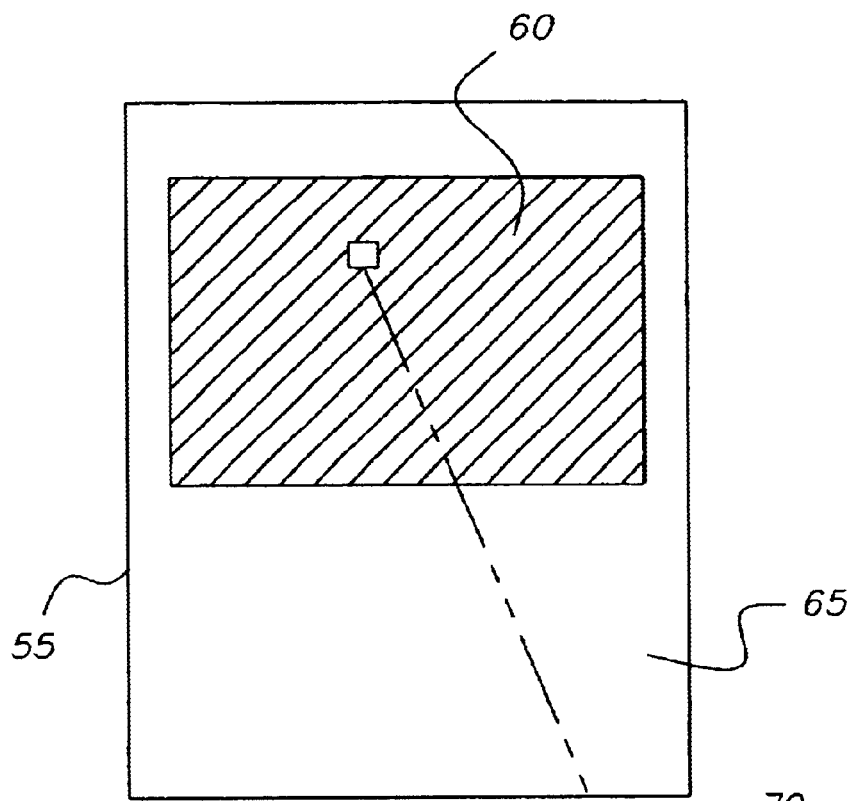
FIG. 3 is a schematic view of a receiver illustrating a printed area and a non-printed area of the receiver.
Figure 4:
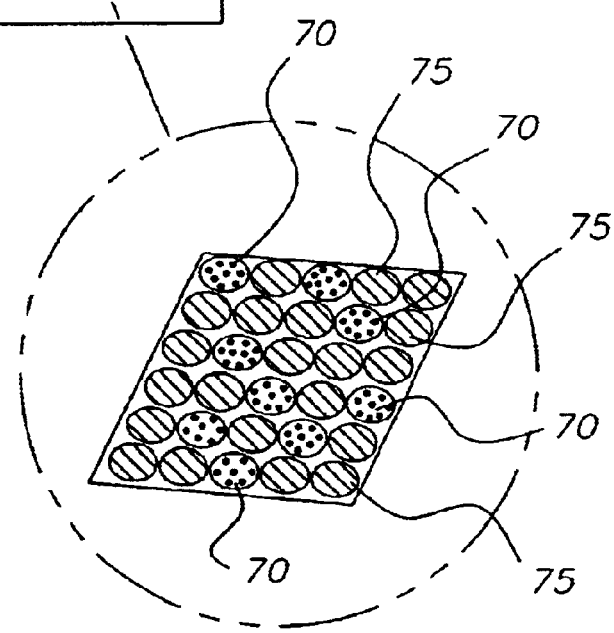
FIG. 4, is an enlarged view of a portion of FIG. 3 illustrating an imaged area and a non-imaged area of the printed area of the receiver.

Referring to FIGS. 3 and 4, during printing (or prior to printing), the image processor 30 processes the image data (or preprocesses the image data) into an ink drop pattern using any image processing algorithms known in the art, for example, tone scale calibration, color transformation, halftoning, ink rendering and so forth. At this time, the image processor 30 identifies a printed area 60 of the image and a non-printed area 65 (if any) of the image based on image data received from the digital image source 25. The image processor 30 also identifies an image area(s) 70 of the printed area of the image and a non-imaged area(s) 75 of the printed area of the image.

As defined herein, "a printed area" of the image means an area(s) of the receiver that has ink deposited thereon (thereby forming, for example, text or an image). Additionally, "a non-printed area" of the image means an area(s) of the receiver that does not have ink deposited thereon (thereby forming, for example, a border having no ink around the printed area of the image on the receiver). In this sense, a border having ink would be included under the definition of "a printed area" of the image.

As defined herein, "an imaged area" of the printed area of the image means an area(s) of the receiver (typically, one or more pixels) within the printed area(s) of the receiver that has one or more ink drops deposited thereon. Additionally, "a non-imaged area" of the printed area of the image means an area(s) of the receiver (typically, one or more pixels) within the printed area(s) of the receiver that does not have one or more ink drops deposited thereon. The "a non-imaged area" of the printed area of the image receives the gloss matching fluid drops according to the present invention.

Then, the image processor 30 sends signals representing the digital image data to the print head drive electronics 80 that prepares electrical signals for the print head 35 according to the digital image data. During each printing pass, a transport controller (not shown) controls control electronics (not shown) in any known manner to operate a receiver transport motor mechanism (not shown) and a print head translating motor (not shown).

The print head drive electronics 80 operate the ink jet print head segments 40b–40g to deliver one or more drops 50 of ink to the receiver 55 to form pixels 70 in imaged area(s) of the printed area(s) 60 of the receiver 55. Additionally, the print head drive electronics 80 operate the ink jet print head segment 40a to deliver one or more drops 50 of gloss matching fluid to the receiver 55 to form pixels 75 in non-imaged area(s) of the printed area(s) 60 of the receiver 55. Typically, an image is formed by a plurality of ink pixels 70 and gloss matching fluid pixels 75. Additionally, each image can be formed by a single printing pass by print head 35 or a plurality of printing passes by print head 35.

Referring to FIGS. 5–10, additional printer and cartridge embodiments usable with the invention are described with like elements referenced using like reference symbols.

Figure 5:
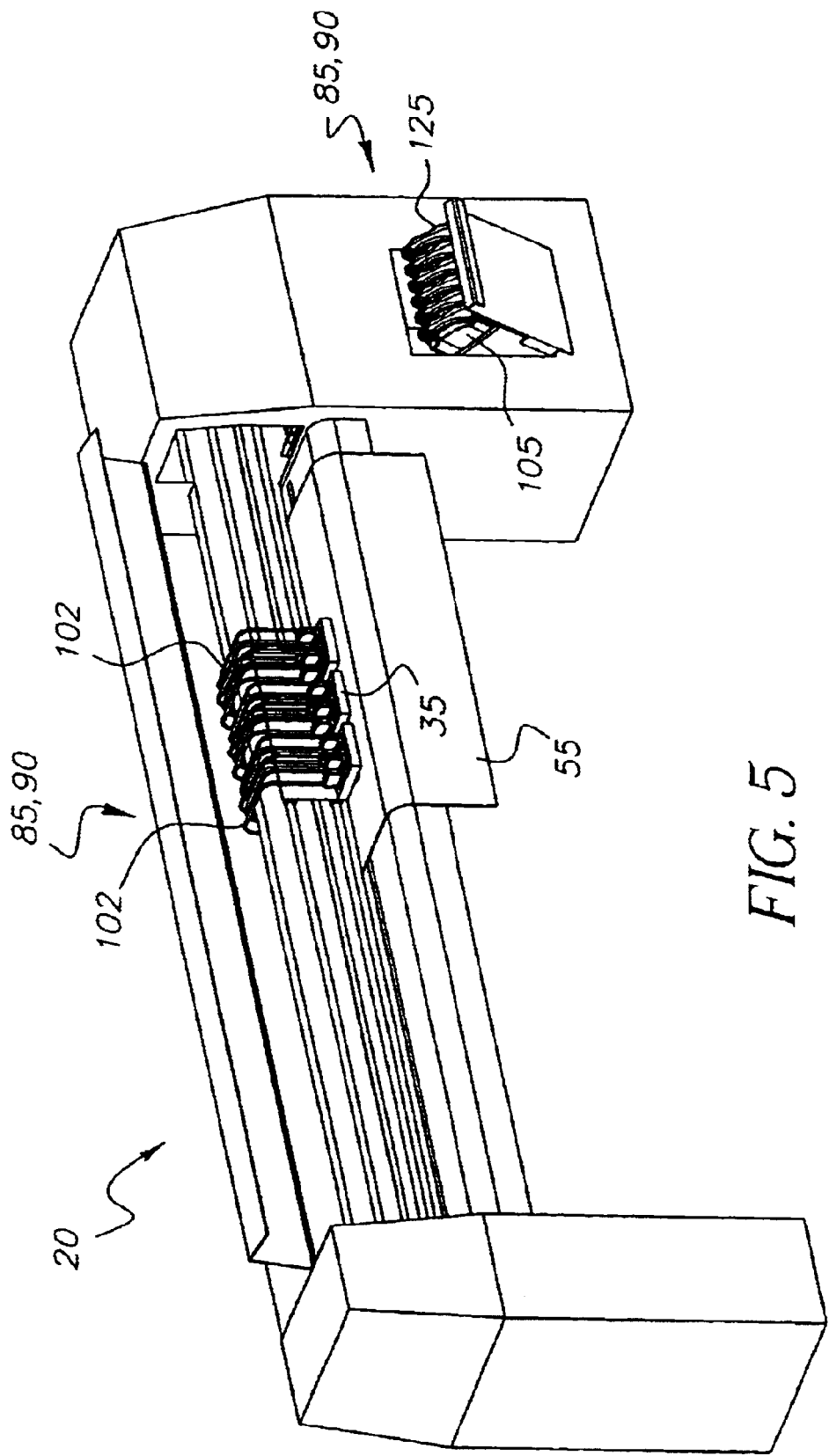
Figure 6:
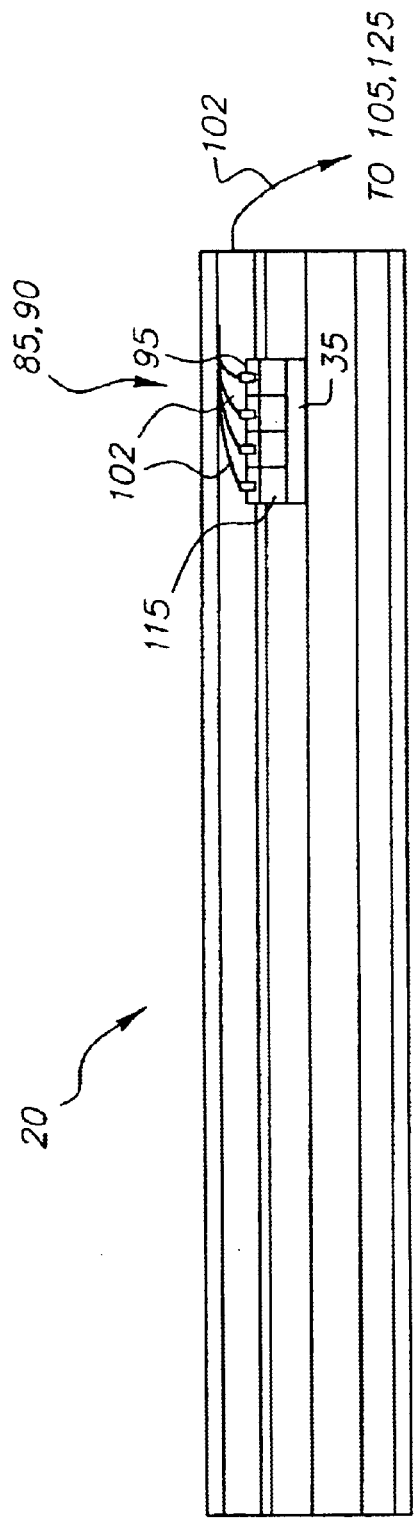
Figure 7:
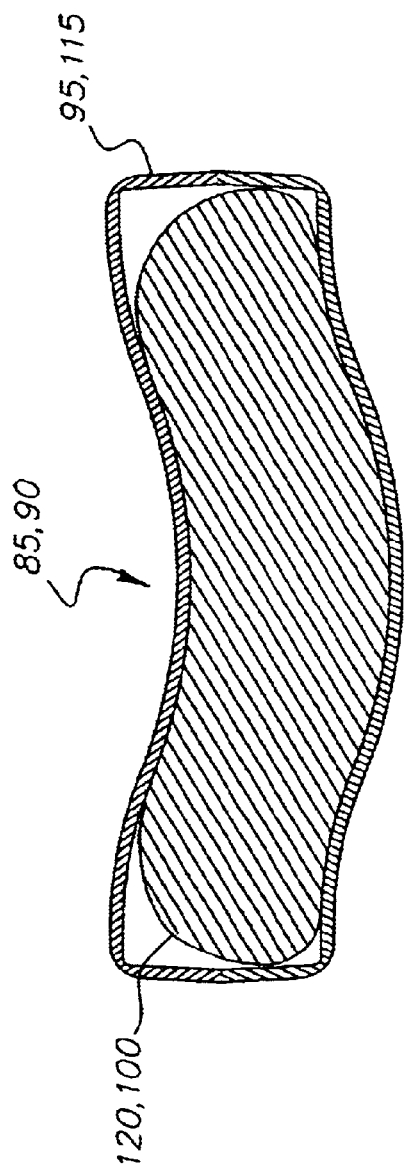

The printer system 20 can include various types of ink sources 85. For example, the ink source 85 can include a cartridge 95. The cartridge 95 can include a flexible membrane 100 (as shown in FIG. 7). The cartridge 95 can be positioned on the printhead 35 (as shown in FIG. 6). The cartridge 95 can be connected in fluid communication through a tube 102 (for example, a flexible tube, rigid tube, etc.) to an ink reservoir 105 positioned remotely relative to the printhead 35 (as shown in FIG. 6). Alternatively, only the ink reservoir 105 can be connected to the print head 35 through tube 102 (as shown in FIG. 5). The cartridge 95 can also be removeably positioned on the printhead 35.

Figure 8:
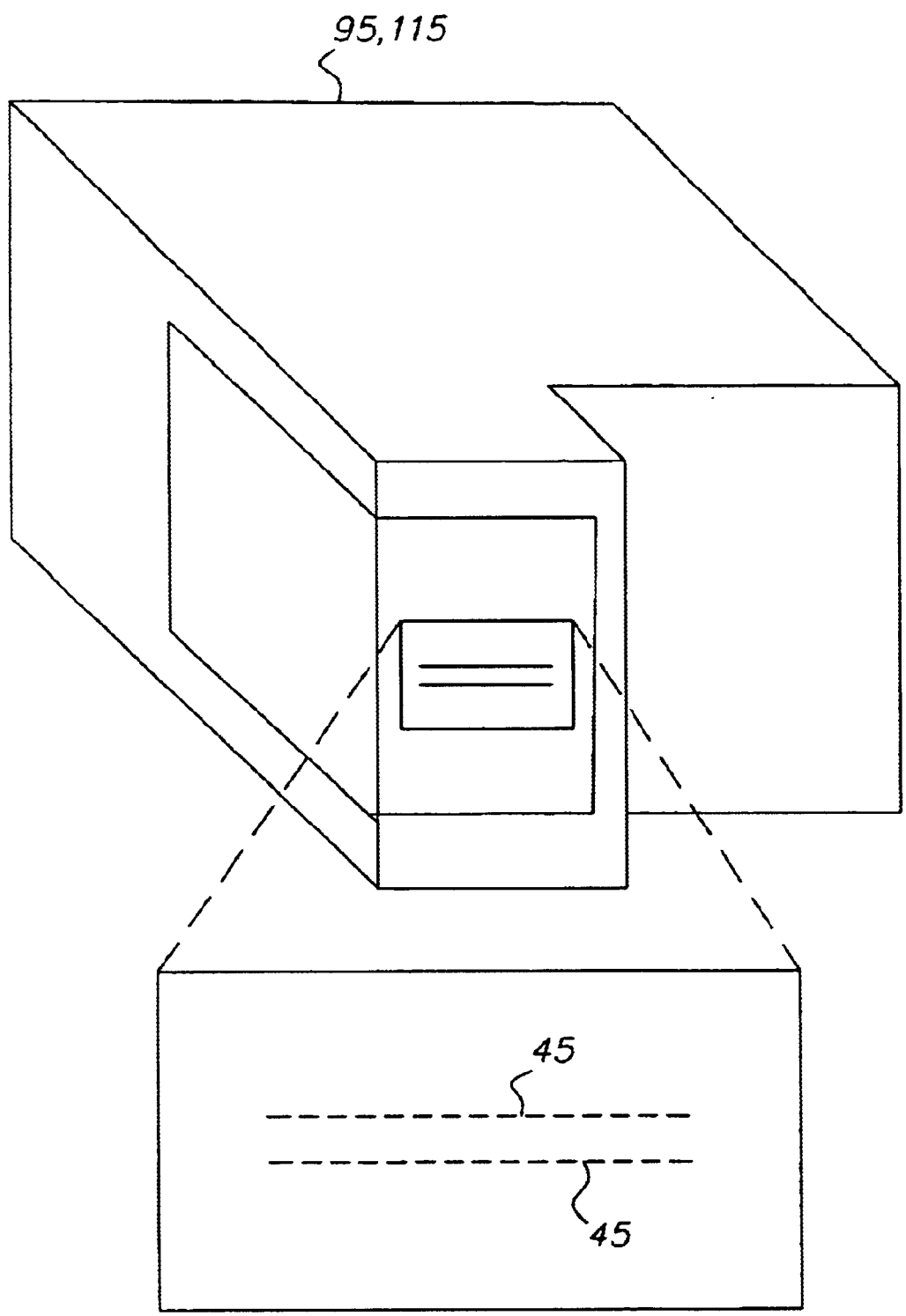

In some applications, the printhead 35, for example, at least one of segments 40a–40g of print head 35 includes the drop forming mechanism 110, typically positioned below ejection nozzles 45. However, in other applications, the cartridge 95 (and/or 115 as described below) may include the drop forming mechanism 110, again typically positioned below ejection nozzles 45 (as shown in FIGS. 8–10). When this occurs, the cartridge 95 (and/or 115) is considered the printhead segment 40a, and/or at least one of printhead segments 40b–40g.

The printer system 20 can also include various types of gloss matching fluid sources 90. For example, the gloss matching fluid source 90 can comprise a cartridge 115. The cartridge 115 can comprise a flexible membrane 120 (as shown in FIG. 7). The cartridge 115 can be positioned on the printhead 35 (as shown in FIG. 6). The cartridge 115 can be connected in fluid communication through tube 102 to a gloss matching fluid reservoir 125 positioned remotely relative to the printhead 35 (as shown in FIG. 6). Alternatively, only the gloss matching fluid reservoir 125 can be connected through tube 102 to the print head 35 (as shown in FIG. 5). The cartridge 115 can also be removeably positioned on the printhead 35.

Representative examples of the gloss matching fluids, inks, and receivers, discussed above, along with illustrative examples comparing images having gloss matching fluid(s) to images having no gloss matching fluid(s) will now be described in more detail.

Gloss, commonly referred to as specular gloss, of a surface is defined as its degree of approach to a mirror-like surface. It is a measure of the amount of energy reflected at a reflection angle equal to or near the angle of incidence. Specular gloss can be measured in terms of gloss units (gu), at several angles, e.g. 20°, 30°, 45°, 60°, 75° and 80° from the surface normal. Gloss meters are used to measure the gloss of a sample at various angles. The BYK-Gardner micro-TRI-glossmeter is an example of such an instrument.

Both ink and receiver play an important role in the gloss levels of an ink jet printed image. The gloss levels of a receiver can be influenced by the receiver design including particle sizes of the surface coating and surface roughness of the coated paper support. On the other hand, ink factors also play key roles in the gloss of a printed image; these can include, though not limited to, for example, the refractive index of polymers in the inks, the film forming property of the polymers in the inks after printing, and the ink load deposit on the receiver. For particle-containing inks, such as pigment based inks, particle sizes and its distribution also have a significant impact on the gloss levels.

When an image has certain levels of gloss difference between the imaged areas and non-imaged areas, the observed image quality can be significantly hampered. One way to quantify this gloss difference is by defining a parameter named Relative Gloss Difference (RGD) as defined by the following equation:

$$RGD\% = \frac{\sum_{I=1}^{N} |Gloss(\text{Imaged Areas})_I - Gloss(\text{Non-Imaged Areas})|}{\sum_{I=1}^{N} Gloss(\text{Imaged Areas})_I}$$

$I$ is a variable which identifies a certain color patch used in the evaluation, $N$ is the total number of color patches used in the evaluation.

Gloss Matching Fluid

In order to minimize the gloss difference between imaged and non-imaged areas in response to a digital image on a receiver, the concept of a gloss matching fluid is invented, which is to be delivered to the receiver in accordance with the digital image limiting to the non-imaged areas.

The gloss values (GV) of the color inks are obtained based on the following procedure: load a selected ink set into a printer and then print a test image onto a chosen ink receiver. The selected ink set can include an ink set having a single color ink (for example, black ink) or an ink set having more than one color ink (for example, cyan, magenta, yellow, etc.). The test image is designed to include single color patches of $D_{max}$ density (100% dot coverage). The size of the patch needs to be large enough, for example, approximately 3 by 3 centimeters in size for uniform gloss measurement. The dot coverage is also important in order to minimize the gloss contribution from local areas not covered by the inks at the pixel level. Usually, a reflection density of 1.5 ($D_{max}$) can be achieved at 100% dot coverage. The color used in the evaluation may include any combination of colors capable of being generated by the selected ink set, such as primary-colors (for example, cyan, magenta, yellow, black) or, optional secondary colors (for example, red, green, blue), process black (a combination of cyan, magenta and yellow) or 400% black (a combination of cyan, magenta, yellow and black). Alternatively, the color ink set can be a monochrome set comprising blacks or blacks with various gray levels. After allowing the printed test images to dry for 24 hours at ambient temperature and humidity, the gloss value of color patch i ($GV_1$) at a certain specular angle from the surface normal of the receiver (for example, 60 degree) of color patch i is then measured, using a gloss meter, for example, the BYK-Gardner micro-TRI-gloss meter. The minimum gloss value ($GV_{min}$) and the maximum gloss value ($GV_{max}$) of these color patches are calculated based on the following equations:

$$GV_{min} = MIN(GV_1, GV_2, \ldots, GV_i, \ldots, GV_n)$$

$$GV_{max} = MAX(GV_1, GV_2, \ldots, GV_i, \ldots, GV_n)$$

where i is a variable which identifies a certain color patch used in the evaluation, and n is the total number of color patches used in the evaluation.

The gloss value of the gloss matching fluid ($GV_{GMF}$) is obtained similarly to the gloss value of the color inks described above except that the gloss matching fluid is used instead of the color ink. The gloss matching fluid composition is chosen so that after the deposition of the fluid, RGD is reduced as compared to RGD calculated based on gloss levels measured from images without the fluid deposition on the non-imaged area.

It is desirable to have gloss matching fluid capable of generating gloss level, as measured from areas on the receiver after fluid deposition, in the range of between about 10% of the lowest gloss level to about 150% of the highest gloss level of the ink sets based on the above measurement from the test images, for example, $0.1\ GV_{min} \leq GV_{GMF} \leq 1.5\ GV_{max}$, $0.2\ GV_{min} \leq GV_{GMF} \leq 1.5\ GV_{max}$, $0.3\ GV_{min} \leq GV_{GMF} \leq 1.5\ GV_{max}$, $0.4\ GV_{min} \leq GV_{GMF} \leq 1.5\ GV_{max}$, $0.5\ GV_{min} \leq GV_{GMF} \leq 1.5\ GV_{max}$, $0.6\ GV_{min} \leq GV_{GMF} \leq 1.4\ GV_{max}$, $0.7\ GV_{min} \leq GV_{GMF} \leq 1.3\ GV_{max}$, $0.8\ GV_{min} \leq GV_{GMF} \leq 1.2\ GV_{max}$, $0.9\ GV_{min} \leq GV_{GMF} \leq 1.1\ GV_{max}$, and $1.0\ GV_{min} \leq GV_{GMF} \leq 1.0\ GV_{max}$.

Even more preferably, the gloss matching fluid is capable of generating gloss level, as measured from areas on the receiver after fluid deposition, in the range of between the lowest to highest gloss levels of the ink sets based on the above measurement from the test images, i. e., $GV_{min} \leq GV_{GMF} \leq GV_{max}$. Additionally, in an application where the ink set has a single color ink, $GV_{min}$ will usually equal $GV_{max}$.

The gloss matching fluid composition is further chosen so that after deposition of the fluid, RGD is reduced as compared to RGD calculated based on gloss levels measured from images without the fluid deposition on the non-imaged area. It was determined that it is preferable that the relative gloss difference (RGD) satisfy the following condition: 0%≦RGD≦20%, and more preferably, 0%≦RGD≦10%. It is still more preferable that the relative gloss difference (RGD) satisfy the following condition: 0%≦RGD≦5%. It is still more preferable that the relative gloss difference (RGD) satisfy the following condition: 0%≦RGD≦3%. It is still more preferable that the relative gloss difference (RGD) satisfy the following condition: 0%≦RGD≦1%.

Typically, the gloss matching fluid comprises an aqueous carrier, a film-forming polymer, optionally a non-film forming particles. The film-forming polymer can be a water soluble polymer or a water dispersible polymer or polymer latex. The appropriate polymer should be selected so that the polymer is capable of forming a film after printing. The minimum film formation temperature of a polymer is generally slightly below its glass transition temperature, and this temperature may be further depressed by the presence of plasticizing solvents. The presence of humectants and high boiling point solvents may cause the film formation temperatures of polymeric additives to decrease. It is preferred that the polymer has a glass transition temperature in the range of −20° C. to 80° C. More preferably, the polymer should have a glass transition temperature in the range of 0° C. to 60° C.

The gloss matching fluid can further comprise non film-forming particles, including polymer particles and inorganic particles such as silica, alumina, titanium dioxide, clay, calcium carbonate, barium sulfate, or zinc oxide. It is preferred that the polymer particles have a glass transition temperature greater than 60° C. More preferably, the polymer should have a glass transition temperature greater than 80° C.

The water-dispersible polymers, both film forming or non-film forming, are generally hydrophobic polymers of any composition that can be stabilized in a water-based medium. Such hydrophobic polymers are generally classified as either condensation polymer or addition polymers. Condensation polymers include, for example, polyesters, polyamides, polyurethanes, polyureas, polyethers, polycarbonates, polyacid anhydrides, and polymers comprising combinations of the above-mentioned types. Addition polymers are polymers formed from polymerization of vinyl-type monomers including, for example, allyl compounds, vinyl ethers, vinyl heterocyclic compounds, styrenes, olefins and halogenated olefins, ethylenically unsaturated carboxylic acids and esters derived from them, unsaturated nitriles, vinyl alcohols, acrylamides and methacrylamides, vinyl ketones, multifunctional monomers, or copolymers formed from various combinations of these monomers.

Preferred water soluble or dispersible polymers include those styrene/acrylic polymers prepared by free-radical polymerization of vinyl monomers in aqueous emulsion such as Trudot IJ® series from Mead Westvaco or Joncryl® series from Johnson Polymers, polyester ionomers such as Eastman AQ® polyesters, (Eastman Chemical Company) including Eastman Polyesters AQ 29, AQ 38, and AQ 55, and polyurethanes, for example, those disclosed in U.S. patent application Ser. No. 09/548,514, filed Apr. 13, 2000, now U.S. Pat. No. 6,268,101, issued on Jul. 31, 2001, to Yacobucci et al., the disclosure of which is incorporated by reference, Witcobond® polyurethane dispersion by Witco Corp., and Sancure® polyurethane by BF Goodrich Company.

The film forming polymer can be present in the gloss matching fluid in any effective amount, generally from about 0.1 to about 10% by weight, and preferably from about 0.5% to about 5% by weight.

The non-film forming particles can be present in the gloss matching fluid in any effective amount, generally from about 0.1 to about 10% by weight, and preferably from about 0.5% to about 5% by weight. The mean particles size of the non-film forming particles is generally in the range of 0.01 to 1 micron, more preferably 0.03 to 0.5 micron.

Typically, the aqueous carrier for the gloss matching fluid is water or a mixture of water and at least one water miscible co-solvent. Selection of a suitable mixture depends on requirements of the specific application, such as desired surface tension and viscosity, drying time of the ink jet fluid, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, tetraethylene glycol, propylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, diethylene glycol mono-butyl (or -ethyl) ether, propylene glycol mono-methyl (or -ethyl) ether, poly(ethylene glycol) butyl ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide, 2,2'-thiodiethanol, and tetramethylene sulfone.

Typically, the amount of aqueous carrier employed is in the range of approximately 70 to 98 weight %, preferably approximately 90 to 98 weight %, based on the total weight of the ink. A mixture of water and a polyhydric alcohol, such as diethylene glycol, is useful as an aqueous carrier. In a preferred embodiment, the inks contain from about 5 to about 60 weight % of water miscible organic solvent. Percentages are based on the total weight of the aqueous carrier.

Other additives which may optionally be present in the ink jet gloss matching fluid include thickeners, conductivity enhancing agents, anti-kogation agents, drying agents, waterfast agents, binders, viscosifiers, buffering agents, anti-mold agents, anti-curl agents, stabilizers and defoamers. Additionally, the ink compositions can include a humectant, a surfactant, a penetrant, a biocide, etc. as is required depending on the application.

A humectant is usually employed in the gloss matching fluid to help prevent the ink from drying out or crusting in the orifices of the printhead. Examples of humectants which can be used include polyhydric alcohols, such as ethylene glycol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl or mono-butyl ether (TEGMBE), diethylene glycol di-methyl or di-ethyl ether, poly(ethylene glycol) monobutyl ether (PEGMBE), and diethylene glycol monobutylether(DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone, etc.

Preferred humectants for the gloss matching fluid include DEG, glycerol, DEGMBE, TEGMBE, 1,2-hexanediol, 1,5-pentanediol, urea, 2-pyrrolidinone, EHMP and mixtures thereof. The humectant may be employed in each ink in an amount of from about 5 to about 60 weight percent.

Surfactants may be added to the gloss matching fluid to adjust the surface tension to an appropriate level. The surfactants may be anionic, cationic, amphoteric or nonionic and used at levels of 0.01 to 1% of the ink composition.

Preferred surfactants include Surfynol® 465 (available from Air Products Corp.) and Tergitol® 15-S-5 (available from Union Carbide).

A penetrant (0–10% by weight) may also be added to the gloss matching fluid to help the ink penetrate the receiving substrate, especially when the substrate is a highly sized paper. Examples of such penetrant include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

A biocide may be added to the gloss matching fluid to suppress the growth of microorganisms such as molds, fungi, etc. in aqueous inks. A preferred biocide for the ink composition and/or gloss matching fluid is Proxel® GXL (Avecia Corp.) at a final concentration of 0.0001–0.5 wt. %.

The pH of the aqueous gloss matching fluid may be adjusted by the addition of organic or inorganic acids or bases. Typically, fluids will have a preferred pH of from about 2 to 10. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine (TEA) and tetramethylethlenediamine.

In applications where pigments are used as the colorant in the ink, any known pigment, or combination of pigments, commonly used in an ink composition having an aqueous carrier. They can be either self-dispersible pigment such as those described in U.S. Pat. No. 5,630,868, encapsulated pigments such as those described in the pending U.S. patent application Ser. No. 09/822,723. Additionally, the pigments can be stabilized by a dispersant, for example, those pigments disclosed in U.S. Pat. Nos. 5,026,427; 5,086,698; 5,141,556; 5,160,370; and 5,169,436. The exact choice of pigments will depend upon the specific application and performance requirements such as color reproduction and image stability. Pigments suitable for use include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include Color Index (C.I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C.I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Violet 1, 2, 3, 5:1, 13, 19, 23, 25, 27, 29, 31, 32, 37, 39, 42, 44, 50; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C.I. Pigment Green 1, 2, 4, 7, 8, 10, 36, 45; C.I. Pigment Black 1, 7, 20, 31, 32, and C.I. Pigment Brown 1, 5, 22, 23, 25, 38, 41, 42. In one embodiment, the pigment is C.I. Pigment Blue 15:3, C.I. Pigment Red 122, C.I. Pigment Yellow 155, C.I. Pigment Yellow 74, bis (phthalocyanylalumino)tetraphenyldisiloxane or C.I. Pigment Black 7.

When a pigment dispersant is added to the ink composition, the pigment dispersant(s) can include water-soluble resins, surface-active agents, and the like. Examples of water-soluble resins include natural resins, semi-synthetic resins, synthetic resins, etc. Examples of synthetic resins include alkali-water-soluble resins such as polyacrylic acid resins, polymaleic acid resins, styrene-acrylic acid copolymers and styrene-maleic acid copolymers, water-soluble styrene resins, polyvinyl pyrrolidone, polyvinyl alcohol, water-soluble urethane resins, etc. Examples of surface-active agents include anionic surface-active agents, cationic surface-active agents, nonionic surface-active agents, ampholytic surface-active agents, etc.

In the case of organic pigments, the ink may contain up to approximately 20% pigment by weight, but will generally be in the range of approximately 0.1 to 10%, preferably approximately 0.1 to 5%, by weight of the total ink composition for most ink jet printing applications. If an inorganic pigment is selected, the ink will tend to contain higher weight percentages of pigment than with comparable inks employing organic pigments.

Instead of pigment, dye can also be used as the ink colorant. The dye can be either water insoluble or water-soluble. The water insoluble dye can be dispersed or encapsulated into water dispersible particles as disclosed in U.S. Ser. No. 10/020,694, filed Dec. 14, 2001. A broad range of water-insoluble dyes may be used such as an oil dye, a disperse dye, or a solvent dye, such as Ciba-Geigy Orasol Red G, Ciba-Geigy Orasol Blue GN, Ciba-Geigy Orasol Pink, and Ciba-Geigy Orasol Yellow. Preferred water-insoluble dyes can be xanthene dyes, methine dyes, polyrnethine dyes, anthroquinone dyes, merocyanine dyes, azamethine dyes, azine dyes, quinophthalone dyes, thiazine dyes, oxazine dyes, phthalocyanine dyes, mono or poly azo dyes, and metal complex dyes. More preferably, the water insoluble dyes can be an azo dye such as a water insoluble analog of the pyrazoleazoindole dye disclosed in U.S. Ser. No. 09/689,184 filed Oct. 12, 2000, and the arylazoisothiazole dye disclosed in U.S. Pat. No. 4,698,651, or a metal-complex dye, such as the water-insoluble analogues of the dyes described in U.S. Pat. Nos. 5,997,622 and 6,001,161, i.e., a transition metal complex of an 8-heterocyclylazo-5-hydroxyquinoline. The solubility of the water insoluble dye can be less than 1 g/L in water, and more preferably less than 0.5 g/L in water.

In the case of water soluble dyes, the ink may also include a water dispersible polymer such as those described in pending U.S. patent application Ser. No. 09/742,961. A broad range of water-soluble dyes can be used, such as reactive dyes, direct dyes, anionic dyes, acid dyes, food dyes and the like such as those described in U.S. Pat. No. 5,973,026. The water-soluble dye may be a cationic or an anionic dye. The cationic dye can be an azo dye, such as a quaternized pyrazoleazoaniline dye as disclosed in U.S. patent application Ser. No. 09/643,281, filed Aug. 22, 2000; a triarylmethane dye; an azine dye; a phthalocyanine dye; an oxazine dye or a thiazine dye. The water-soluble dye may be an anionic dye such as a metal-complex dye, such as a transition metal complex of an 8-heterocyclylazo-5-hydroxyquinoline; an azo dye, such as C.I. Direct Yellow 132; a phthalocyanine dye such as C.I. Direct Blue 199; an anthraquinone dye, or an anthrapyridone dye. U.S. patent application Ser. No. 09/387,585, filed Aug. 31, 1999 of Erdtmann et al. discloses examples of the above dyes.

The dye can be present in the inkjet ink in any effective amount, generally from about 0.1 to about 10 percent by weight, and preferably from about 0.5 percent to about 6 percent by weight.

Receiver

Many ink receiving elements commonly used in ink jet printing can be used. Depending on the receiver type, the differential gloss varies as will be reflected by RGD % value. The support for the ink-receiving element can be paper or resin-coated paper, plastics such as a polyolefin type resin or a polyester-type resin such as poly(ethylene terephthalate), polycarbonate resins, polysulfone resins, methacrylic resins, cellophane, acetate plastics, cellulose diacetate, cellulose triacetate, vinyl chloride resins, poly(ethylene naphthalate), polyester diacetate, various glass materials, etc. or comprising an open pore structure such as those made from polyolefins or polyesters. The thickness of the support can be, for example, from about 12 to about 500 $\mu$m, preferably from about 75 to about 300 $\mu$m.

The ink-receiving layer can be hydrophilic polymer which is capable of absorbing and retaining an ink or can be porous layer having interconnecting voids. In a preferred embodiment, the hydrophilic polymer can include poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly(acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. Preferably, the hydrophilic polymer is poly(vinyl alcohol), hydroxypropyl cellulose, carboxymethyl cellulose, hydroxypropyl methyl cellulose, a poly(alkylene oxide), poly(vinyl pyrrolidinone), or copolymers thereof or gelatin. In another preferred embodiment, the porous ink-receiving layer may contain inorganic particles such as silica, alumina, titanium dioxide, clay, calcium carbonate, barium sulfate, or zinc oxide. In an additional preferred embodiment, the porous ink-receiving layer comprises from about 20% to about 95% inorganic particles and from about 5% to about 80% polymeric binder, such as gelatin, poly(vinyl alcohol), poly(vinyl pyrrolidinone) or poly(vinyl acetate) and copolymers thereof. The porous ink-receiving layer can also contain polymer micro-porous structures without inorganic filler particles as shown in U.S. Pat. Nos. 5,374,475 and 4,954,395. A wide variety of organic and inorganic pigments, alone or in combination, may be selected for use in the present application.

The following examples illustrate the utility of the present invention.

EXAMPLES

Preparation of Colored Pigment Ink

Cyan Pigment Dispersion

The cyan pigment dispersion contains: 8000 g of Polymeric beads, mean diameter of 50 $\mu$m (milling media); 1600 g of Bridged aluminum phthalocyanine pigment (Eastman Kodak); 960 g of Oleoyl methyl taurine, (OMT) Potassium salt and 5440 g of Deionized water.

The above components were milled in a 40 liter double walled vessel obtained from BYK-Gardner using a high energy media mill manufactured by Morehouse-Cowles Hochmeyer. The mill was run for approximately 8 hours at room temperature. During the milling process, three batches of pigment samples (15.0 g each) as PC-1, PC-2, and PC-3 were obtained such that the median pigment particle sizes are about 30 nm, 100 nm and 150 nm as measured by MICROTRAC II Ultrafine particle analyzer (UPA) manufactured by Leeds & Northrup. The medium particle size represents that 50% of the volume in the sample is smaller than the indicated size. The dispersion was separated from the milling media by filtering the mill grind through a 4–8 $\mu$m KIMAX® Buchner Funnel obtained from VWR Scientific Products. Additional 8000 g of dilution water was added to the filtered dispersion followed by a biocide, Proxel® GXL (Zeneca Corp.). The pigment is about 10.0% by weight of the total final dispersion and the biocide is about 230 ppm by weight of the total final dispersion.

Yellow Pigment Dispersion

This dispersion was prepared the same as the Cyan Pigment Dispersion 1 except that Pigment Yellow 155 (Clariant Corp.) was used instead of Bridged aluminum phthalocyanine pigment. The amount of OMT Potassium salt was 25 weight % based on the pigment. During the milling process, three batches of pigment samples (15.0 g each) as PY-1, PY-2, and PY-3 were obtained such that the median pigment particle sizes are about 40 nm, 100 nm and 160 nm as measured by MICROTRAC II Ultrafine particle analyzer (UPA) manufactured by Leeds & Northrup.

Cyan Ink C1

To prepare the Cyan Ink C1, 2.2 g of Pigment Dispersion PC-1 (10% pigment by weight), 0.05 g Surfynol® 465 (Air Products Inc.), 0.6 g di ethylene glycol and 0.3 g di(propyleneglycol) methyl ether (Dowanol® DPM) were added together with distilled water so that the final weight of the ink was 10.0 g. The final ink contained 2.2% bridged aluminum phthalocyanine pigment, 0.50% Surfynol® 465, 6.0% diethylene glycol and 3% di(propyleneglycol) methyl ether. The solution was filtered through a 3 $\mu$m polytetrafluoroethylene filter and filled into an empty Epson 660 ink jet cartridge.

Cyan Ink C2

Cyan Ink C2 is prepared similar to Cyan Ink C1 except that Pigment Dispersion PC-2 is used instead of Pigment Dispersion PC-1.

Cyan Ink C3

Cyan Ink C3 is prepared similar to Cyan Ink C1 except that Pigment Dispersion PC-3 is used instead of Pigment Dispersion PC-1.

Cyan Ink C4

Cyan Ink C4 is obtained from an Epson C80 cyan cartridge, Cat No. T032220. The ink was filtered through a 3 $\mu$m polytetrafluoroethylene filter and filled into an empty Epson 660 ink jet cartridge.

Magenta Ink M1

Magenta Ink M1 is obtained from the dark magenta channel of an Epson 2000P color cartridge, CAT. No. T106201. The ink was filtered through a 3 $\mu$m polytetrafluoroethylene filter and filled into an empty Epson 660 ink jet cartridge.

Magenta Ink M2

Magenta Ink M2 is obtained from an Epson C80 magenta cartridge, CAT. No. T032320. The ink was filtered through a 3 $\mu$m polytetrafluoroethylene filter and filled into an empty Epson 660 ink jet cartridge.

Yellow Ink Y1

To prepare the Yellow Ink Y1, 2.5 g of Pigment Dispersion PY-1 (10% pigment by weight), 0.05 g Surfynol® 465 (Air Products Inc.), 0.8 g glycerol, 1.0 g triethylene glycol and 0.3 g di(propyleneglycol) methyl ether (Dowanol®

DPM), and 0.33g of polymer solution containing 30.5% AQ55® (Eastman Chemical) by weight were added together with distilled water so that the final weight of the ink was 10.0 g. The final ink contained 2.5% Pigment Yellow 155, 0.50% Surfynol® 465, 8.0% glycerol, 10.0% triethylene glycol, 3% di(propyleneglycol) methyl ether and 1% AQ55. The solution was filtered through a 3 μm polytetrafluoroethylene filter and filled into an empty Epson 660 ink jet cartridge.

Yellow Ink Y2

Yellow Ink Y2 was prepared similar to Yellow Ink Y1 except that pigment dispersion PY-2 was used instead of pigment dispersion PY-1.

Yellow Ink Y3

Yellow Ink Y3 was prepared similar to Yellow Ink Y1 except that pigment dispersion PY-3 was used instead of pigment dispersion PY-1.

Preparation of Gloss Matching Fluid
Preparation of Polymer P1

Polymer P1 with the structure shown below was prepared by conventional emulsion polymerization method, for example, as disclosed in EP108757A2.

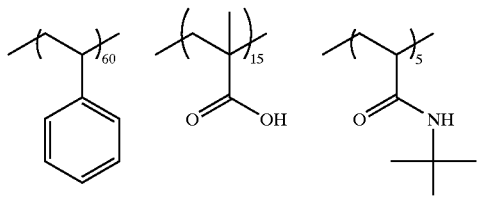

Gloss Matching Fluid 1 (GMF1)

To prepare the gloss matching fluid GMF1, 0.33 g of polymer solution containing 30.5% AQ55® (Eastman Chemical) by weight, 0.05 g Surfynol® 465 (Air Products Inc.), 0.6 g diethylene glycol and 0.3 g di(propyleneglycol) methyl ether (Dowanol® DPM) were added together with distilled water so that the final weight of the fluid was 10.0 g. The final fluid contained 1.0% AQ55, 0.50% Surfynol® 465, 6.0% diethylene glycol and 3% di(propyleneglycol) methyl ether. The solution was filtered through a 3 μm polytetrafluoroethylene filter and filled into an Epson 660 inkjet cartridge.

Gloss Matching Fluid 2 (GMF2)

Gloss matching fluid GMF2 was prepared similar to gloss matching fluid GMF1 except that polymer PI was used instead of AQ55®.

Gloss Matching Fluid 3 (GMF3)

Gloss matching fluid GMF3 was prepared similar to gloss matching fluid GMF1 except that inorganic particles Snowtex ST-ZL® (41.5% active), a silica dispersion from Nissan Chemical Industry, is added in addition to AQ55®. The final fluid contains 2% by weight of Snowtex ST-ZL.

Gloss Matching Fluid 4 (GMF4)

Gloss matching fluid GMF4 was prepared similar to gloss matching fluid GMF1 except that inorganic particles Nyacol IJ200®(50% active), a silica dispersion from Akzo-Nobel, is also added in addition to AQ55®. The final fluid contains 2% by weight of Nyacol IJ200®.

Gloss Matching Fluid 5 (GMF5)

Gloss matching fluid GMF5 was prepared similar to gloss matching fluid GMF1 except that inorganic particle that inorganic particles Nalco2329® (40% active), a silica dispersion from Nalco Chemical Company, is also added in addition to AQ55®. The final fluid contains 2% of Nalco2329®.

Gloss Matching Fluid 6 (GMF6)

Gloss matching fluid GMF6 was prepared similar to gloss matching fluid GMF1 except that inorganic particles EF10611 (40% active), a silica dispersion from Akzo-Nobel, is also added in addition to AQ55®. The final fluid contains 2% of EF10611®.

Printing and Evaluation

Elements were prepared using test images consisting of cyan, magenta and yellow single color patches of approximately 3 by 3 centimeters in size with a Dmax density (100% dot coverage). Using an Epson 660 ink jet printer loaded with the above Gloss Matching Fluids and colored inks, the above test images were printed onto commercially available Epson Premium Glossy Paper, Cat. No SO41286. The elements were allowed to dry for 24 hours at ambient temperature and humidity. Using the BYK-Gardner micro-TRI-glossmeter, gloss level from each patch was measured at 60° specular angle from a surface normal of the receiver. Multiple measurements were carried out using three individual patches of the same color and the average values were listed in Table 1. The relative gloss difference (RGD) was then calculated as shown in Table 1.

TABLE 1

| Element | Gloss Matching Fluid | Color Ink | 60° Gloss Value | | | | | | | RGD (%) |
|---|---|---|---|---|---|---|---|---|---|---|
| | | | Non-Imaged | C | M | Y | $GV_{min}$ | $GV_{max}$ | $GV_{GMF}$ | |
| Control-1 | — | C1/M1/Y1 | 34 | 90 | 85 | 109 | 85 | 109 | — | 64 |
| I-1 | GMF1 | C1/M1/Y1 | 91 | 90 | 85 | 109 | 85 | 109 | 91 | 3 |
| Control-2 | — | C2/M2/Y2 | 34 | 68 | 66 | 73 | 66 | 73 | — | 51 |
| I-2 | GMF2 | C2/M2/Y2 | 68 | 68 | 66 | 73 | 66 | 73 | 68 | 1 |
| I-3 | GMF3 | C2/M2/Y2 | 69 | 68 | 66 | 73 | 66 | 73 | 69 | 0 |
| I-4 | GMF4 | C2/M2/Y2 | 71 | 68 | 66 | 73 | 66 | 73 | 71 | 3 |
| Control-3 | — | C3/M2/Y3 | 34 | 49 | 66 | 50 | 49 | 66 | — | 38 |
| I-5 | GMF5 | C3/M2/Y3 | 50 | 49 | 66 | 50 | 49 | 66 | 50 | 9 |
| Control-4 | — | C4/M2/Y3 | 34 | 61 | 66 | 50 | 50 | 66 | — | 42 |
| I-6 | GMF6 | C4/M2/Y3 | 57 | 61 | 66 | 50 | 50 | 66 | 57 | 3 |

As shown in Table 1, a lower differential gloss between imaged areas and the non-imaged areas of each Element(s) was achieved using a gloss matching fluid having a gloss value ($GV_{GMF}$) chosen within the range disclosed herein. The RGD of each Element(s) having a gloss matching fluid deposited thereon was reduced as compared to each Element(s) having no gloss matching fluid deposited thereon.

The invention has been described in detail with particular reference to certain preferred embodiments thereof, but it will be understood that variations and modifications can be effected within the scope of the invention.

What is claimed is:

1. A method of providing an image on a receiver comprising:

processing data representing the image to identify a printed area of the image and a non-printed area of the image;

processing data representing the printed area of the image to identify an imaged area and a non-imaged area of the printed area of the image; and operating a printhead having a first segment that applies a gloss matching fluid to the non-imaged area of the printed area of the image and a second segment that applies an ink set having at least one color to the imaged area of the printed area of the image, wherein the ink set has a predetermined minimum gloss value ($GV_{min}$) and a maximum gloss value ($GV_{max}$), and the gloss matching fluid has a predetermined gloss value ($GV_{GMF}$), wherein the predetermined gloss value $GV_{GMF}$ satisfying the following condition: $0.1GV_{min} \leq GV_{GMF} \leq 1.5GV_{max}$, wherein $GV_{min}$ and $GV_{max}$ are predetermined gloss values calculated according to the following equations:

$$GV_{min} = MIN(GV_1, GV_2, \ldots, GV_i, \ldots, GV_n)$$

$$GV_{max} = MAX(GV_1, GV_2, \ldots, GV_i, \ldots, GV_n)$$

where i is a variable which identifies a certain color patch used in the evaluation, and n is the total number of color patches used in the evaluation.

2. The method according to claim 1, wherein the gloss value ($GV_{GMF}$) satisfies the following condition: $GV_{min} \leq GV_{GMF} \leq GV_{max}$.

3. The method according to claim 1, wherein the gloss matching fluid comprises one of a water soluble film forming polymer and a water dispersible film forming polymer.

4. The method according to claim 3, wherein the film forming water dispersible polymer is one of a polyester, a polyurethane, and a polyacrylic.

5. The method according to claim 4, wherein the film forming water dispersible polymer is a sulfonated polyester ionomer.

6. The method according to claim 1, wherein the color ink comprises one of a dye and a pigment.

7. The method according to claim 1, wherein the gloss matching fluid comprises non-film forming particles.

8. The method according to claim 7, wherein the non-film forming particles range in size from 0.01 micron to 1.0 micron.

9. The method according to claim 7, wherein the non-film forming particles range in size from 0.03 micron to 0.5 micron.

10. The method according to claim 7, wherein the non-film forming particles are inorganic particles.

11. The method according to claim 10, wherein the inorganic particles comprise at least one of silica, alumina, titinium dioxide, zirconia, clay, calcium carbonate, barium sulfate, and zinc oxide.

12. The method according to claim 7, wherein the non-film forming particles comprise organic polymeric particles.

13. The method according to claim 12, wherein the organic polymeric particles comprise at least one of a polyurethane with a Tg of greater than 60° C., a polyacrylic with a Tg of greater than 60° C., and a polyester with a Tg of greater than 60° C.

14. The method according to claim 1, wherein the gloss matching fluid comprises an aqueous carrier and a humectant.

15. The method according to claim 1, wherein the printhead is a drop on demand ink jet printhead.

16. The method according to claim 1, wherein the printhead is a continuous ink jet printhead.

17. The method according to claim 1, wherein $GV_{min}$ equals $GV_{max}$.

18. The method according to claim 1, wherein processing the data representing the image comprises using a tone scale calibration image processing algorithm.

19. The method according to claim 1, wherein processing the data representing the image comprises using a color transformation image processing algorithm.

20. The method according to claim 1, wherein processing the data representing the image comprises using a halftoning image processing algorithm.

21. The method according to claim 1, wherein processing the data representing the image comprises using an ink rendering image processing algorithm.

22. The method according to claim 1, wherein operating the printhead comprises forming the image on a receiver with a single printing pass of the printhead.

23. The method according to claim 1, wherein operating the printhead comprises forming the image on a receiver with a plurality of printing passes of the printhead.

24. A method of providing an image on a receiver comprising:

operating a printhead having a first segment that applies a gloss matching fluid to the non-imaged area of the printed area of the image and a second segment that applies an ink set having at least one color to the imaged area of the printed area of the image, wherein the ink set has a predetermined minimum gloss value ($GV_{min}$) and a maximum gloss value ($GV_{max}$), and the gloss matching fluid has a predetermined gloss value ($GV_{GMF}$), wherein the predetermined gloss value $GV_{GMF}$ satisfying the following condition: $0.1GV_{min} \leq GV_{GMF} \leq 1.5GV_{max}$, wherein $GV_{min}$ and $GV_{max}$ are predetermined gloss values calculated according to the following equations:

$$GV_{min} = MIN(GV_1, GV_2, \ldots, GV_i, \ldots, GV_n)$$

$$GV_{max} = MAX(GV_1, GV_2, \ldots, GV_i, \ldots, GV_n)$$

where, i is a variable which identifies a certain color patch used in the evaluation, and n is the total number of color patches used in the evaluation.

25. The method according to claim 24, wherein said gloss value ($GV_{GMF}$) satisfies the following conditions: $GV_{min} \leq GV_{GMF} \leq GV_{max}$.

26. The method according to claim 24, wherein the gloss matching fluid comprises one of a water soluble film forming polymer and a water dispersible film forming polymer.

27. The method according to claim 24, wherein the color ink comprises one of a dye and a pigment.

28. The method according to claim 24, wherein the gloss matching fluid comprises non-film forming particles.

29. The method according to claim 24, wherein the non-film forming particles are inorganic particles.

30. The method according to claim 24, wherein the non-film forming particles comprise organic polymeric particles.

31. The method according to claim 24, wherein the gloss matching fluid comprises an aqueous carrier and a humectant.

32. The method according to claim 24, further comprising:

preprocessing data representing the image to identify the printed area of the image; and preprocessing data representing the printed area of the image to identify an imaged area and a non-imaged area of the printed area of the image.

33. The method according to claim 32, further comprising:
preprocessing data representing the image to identify a non-printed area of the image.

34. The method according to claim 24, wherein $GV_{min}$ equals $GV_{max}$.

35. An apparatus for providing an image on a receiver comprising:
an ink set source having at least one color, the ink set having a predetermined minimum gloss value ($GV_{min}$) and a maximum gloss value ($GV_{max}$);
a source of gloss matching fluid having a predetermined gloss value ($GV_{GMF}$);
a controller adapted to process data representing the image to identify a printed area of the image and a non-printed area of the image and data representing the printed area of the image to identify an imaged area and a non-imaged area of the printed area of the image;
a printhead connected in electrical communication with the controller, the printhead having a first segment connected in fluid communication to the source of gloss matching fluid, the first segment being adapted to apply the gloss matching fluid to the non-imaged area of the printed area of the image based on data received from the controller, the printhead having a second segment connected in fluid communication to the ink set source, the second segment being adapted to apply the ink set having at least one color to the imaged area of the printed area of the image based on data received from the controller, wherein the predetermined gloss value $GV_{GMF}$ satisfying the following condition: $0.1GV_{min} < GV_{GMF} < 1.5GV_{max}$, wherein $GV_{min}$ and $GV_{max}$ are predetermined gloss values calculated according to the following equations:

$$GV_{min} = \text{MIN}(GV_1, GV_2, \ldots, GV_i, \ldots, GV_n)$$

$$GV_{max} = \text{MAX}(GV_1, GV_2, \ldots, GV_i, \ldots, GV_n)$$

where,
i is a variable which identifies a certain color patch used in the evaluation, n is the total number of color patches used in the evaluation.

36. The apparatus according to claim 35, wherein the source of ink comprises a cartridge.

37. The apparatus according to claim 36, wherein the cartridge comprises a flexible membrane.

38. The apparatus according to claim 37, wherein the cartridge is positioned on the printhead.

39. The apparatus according to claim 38, wherein the cartridge is connected in fluid communication to an ink reservoir positioned remotely relative to the printhead.

40. The apparatus according to claim 38, wherein the cartridge is removeably positioned on the printhead.

41. The apparatus according to claim 36, wherein the cartridge includes a drop forming mechanism.

42. The apparatus according to claim 35, wherein at least one of the first segment and the second segment include a drop forming mechanism.

43. The apparatus according to claim 35, wherein the source of gloss matching fluid comprises a cartridge.

44. The apparatus according to claim 43, wherein the cartridge comprises a flexible membrane.

45. The apparatus according to claim 43, wherein the cartridge is positioned on the printhead.

46. The apparatus according to claim 45, wherein the cartridge is connected in fluid communication to a gloss matching fluid reservoir positioned remotely relative to the printhead.

47. The apparatus according to claim 45, wherein the cartridge is removeably positioned on the printhead.

48. The apparatus according to claim 43, wherein the cartridge includes a drop forming mechanism.

49. The apparatus according to claim 35, wherein $GV_{min}$ equals $GV_{max}$.

50. An inkjet ink set composition comprising:
at least one color ink and a gloss matching fluid, the gloss value of the gloss matching fluid ($GV_{GMF}$) satisfying the following condition: $0.1GV_{min} < GV_{GMF} < 1.5GV_{max}$, where $GV_{min}$ and $GV_{max}$ are predetermined gloss values calculated according to the following equations:

$$GV_{min} = \text{MIN}(GV_1, GV_2, \ldots, GV_i, \ldots, GV_n)$$

$$GV_{max} = \text{MAX}(GV_1, GV_2, \ldots, GV_i, \ldots, GV_n)$$

where
i is a variable which identifies a certain color patch used in the evaluation, and n is the total number of color patches used in the evaluation.

51. The composition according to claim 50, wherein said gloss value ($GV_{GMF}$) satisfies the following condition: $GV_{min} \leq GV_{GMF} \leq GV_{max}$.

52. The composition according to claim 50, wherein the gloss matching fluid comprises one of a water soluble film forming polymer and a water dispersible film forming polymer.

53. The composition according to claim 52, wherein the film forming water dispersible polymer is one of a polyester, a polyurethane, and a polyacrylic.

54. The composition according to claim 53, wherein the film forming water dispersible polymer is a sulfonated polyester ionomer.

55. The composition according to claim 50, wherein the color ink comprises one of a dye and a pigment.

56. The composition according to claim 55, where the pigment is a self-dispersing pigment.

57. The composition according to claim 55, wherein the dye is one of a water soluble dye and a water insoluble dye.

58. The composition according to claim 57, wherein the water insoluble dye is either dispersed or encapsulated.

59. The composition according to claim 55, wherein the pigment has a median pigment particle size of less than about 200 nm.

60. The composition according to claim 55, wherein the pigment has a median pigment particle size of less than about 120 nm.

61. The composition according to claim 50, wherein the gloss matching fluid comprises non-film forming particles.

62. The composition according to claim 61, wherein the non-film forming particles range in size from 0.01 micron to 1.0 micron.

63. The composition according to claim 61, wherein the non-film forming particles range in size from 0.03 micron to 0.5 micron.

64. The composition according to claim 61, wherein the non-film forming particles are inorganic particles.

65. The composition according to claim 64, wherein the inorganic particles comprise at least one of silica, alumina, titinium dioxide, zirconia, clay, calcium carbonate, barium sulfate, and zinc oxide.

66. The composition according to claim 61, wherein the non-film forming particles comprise organic polymeric particles.

67. The composition according to claim 66, wherein the organic polymeric particles comprise at least one of a polyurethane with a Tg of greater than 60° C., a polyacrylic with a Tg of greater than 60° C., and a polyester with a Tg of greater than 60° C.

68. The composition according to claim 50, wherein the gloss matching fluid comprises an aqueous carrier and a humectant.

69. The composition according to claim 50, wherein $GV_{min}$ equals $GV_{max}$.

70. The composition according to claim 50, wherein the gloss matching fluid comprises aqueous carrier, a film-forming polymer, and non-film forming particles.

71. The composition according to claim 70, wherein the film-forming polymer is one of a water soluble polymer, water dispersible polymer, and a polymer latex.

72. The composition according to claim 70, wherein the film-forming polymer has a glass transition temperature in the range of −20° C. to 80° C.

73. The composition according to claim 70, wherein the non-film-forming particles are one of inorganic particles and polymer particles.

74. The composition according to claim 73, wherein the inorganic particles are one of silica, alumina, titanium dioxide, clay, calcium carbonate, barium sulfate, zinc oxide, and combinations thereof.

75. The composition according to claim 73, wherein the polymer particles have a glass transition temperature greater than 60° C.

76. The composition according to claim 50, wherein the gloss matching fluid comprises at least one of a film-forming water dispersible polymer and a non-film-forming water dispersible polymer.

77. The composition according to claim 76, wherein the at least one of a film-forming water dispersible polymer and a non-film-forming water dispersible polymer comprises a hydrophobic polymer that can be stabilized in a water-based medium.

78. The composition according to claim 76, wherein the at least one of a film-forming water dispersible polymer and a non-film-forming water dispersible polymer comprises a condensation polymer.

79. The composition according to claim 78, wherein the condensation polymer is one of a polyester, polyamide, polyurethane, polyurea, polyether, polycarbonate, polyacid anhydride, and a polymer comprising combinations thereof.

80. The composition according to claim 76, wherein the at least one of a film-forming water dispersible polymer and a non-film-forming water dispersible polymer comprises an, addition polymer.

81. The composition according to claim 80, wherein the addition polymer is formed by polymerization of vinyl-type monomers.

82. The composition according to claim 81, wherein the vinyl-type monomers are one of an allyl compound, vinyl ether, vinyl heterocyclic compound, styrene, olefin, halogenated olefin, ethylenically unsaturated carboxylic acid, ester derived from ethylenically unsaturated carboxylic acid, unsaturated nitrile, vinyl alcohol, acrylamide, methacrylamide, vinyl ketone, multifunctional monomer, and combinations thereof.

83. The composition according to claim 50, wherein the gloss matching fluid comprises one of a water soluble styrene/acrylic polymer and a water dispersible styrene/acrylic polymer.

84. The composition according to claim 50, wherein the gloss matching fluid comprises one of a water soluble polyurethane and a water dispersible polyurethane.

85. The composition according to claim 50, wherein the gloss matching fluid comprises on of a water soluble polyester ionomer and a water dispersible polyester ionomer.

86. The composition according to claim 50, wherein the gloss matching fluid comprises a film forming polymer in an amount of about 0.1 to about 10% by weight.

87. The composition according to claim 50, wherein the gloss matching fluid comprises a non-film forming polymer in an amount of about 0.1 to about 10% by weight.

88. The composition according to claim 50, wherein the at least one color ink comprises a dye and a water dispersible polymer.

89. The composition according to claim 50, wherein the gloss matching fluid comprises a polymer having the structure:

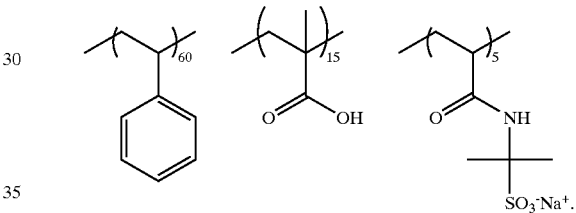

90. The composition according to claim 50, wherein the at least one color ink comprises at least one of an ink having a primary color and an ink having a secondary color.

91. The composition according to claim 50, wherein the at least one color ink has at least one of a cyan color, a magenta color, a yellow color, a red color, a green color, a blue color, and a black color.

92. The composition according to claim 50, wherein the at least one color ink comprises a plurality of black inks having various gray levels.

* * * * *